United States Patent
Quintero Ruiz et al.

(10) Patent No.: US 11,135,834 B1
(45) Date of Patent: Oct. 5, 2021

(54) INTERFERENTIAL PATTERNS FOR PRINTER CALIBRATION

(71) Applicant: HEWLETT-PACKARD DEVELOPMENT COMPANY, L.P., Spring, TX (US)

(72) Inventors: Xavier Quintero Ruiz, Sant Cugat del Valles (ES); Raul Rodriguez Alonso, Sant Cugat del Valles (ES); Montserrat Solano Pallarol, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 10 days.

(21) Appl. No.: 16/603,583

(22) PCT Filed: Nov. 13, 2017

(86) PCT No.: PCT/US2017/061323
§ 371 (c)(1),
(2) Date: Oct. 7, 2019

(87) PCT Pub. No.: WO2019/094046
PCT Pub. Date: May 16, 2019

(51) Int. Cl.
*B41J 2/045* (2006.01)
(52) U.S. Cl.
CPC ........ *B41J 2/04505* (2013.01); *B41J 2/0458* (2013.01); *B41J 2/04581* (2013.01)
(58) Field of Classification Search
CPC .. B41J 2/04505; B41J 2/0458; B41J 2/04581; B41J 2/04503; B41J 2/04506; B41J 2/04508; B41J 2/0451; B41J 2/04513; B41J 2/125; B41J 2002/022; B41J 2/09; B41J 2/12; B41J 2/04526; B41J 2/04558;
(Continued)

(56) References Cited

U.S. PATENT DOCUMENTS

| 6,076,915 A | 6/2000 | Gast et al. |
| 6,290,320 B1 | 9/2001 | Beauchamp et al. |

(Continued)

FOREIGN PATENT DOCUMENTS

| CN | 104955650 | 9/2015 |
| CN | 105050818 | 11/2015 |

(Continued)

OTHER PUBLICATIONS

Print Head Alignment on Mp240, Feb. 13, 2009, https://support.usa.canon.com/kb/index?page=content&id=ART 101878.

*Primary Examiner* — Kristal Feggins
(74) *Attorney, Agent, or Firm* — HP Inc. Patent Department

(57) ABSTRACT

Certain examples describe a method of calibrating a printer and a printing system. An interferential pattern is printed in the form of a print calibration image on a print medium. Data representative of the interferential pattern as printed on the print medium is detected using an optical sensor. The printer is calibrated based on the captured data. The interferential pattern is based on a waveform that varies in amplitude along an axis perpendicular to a printing axis under calibration and has repeated sets of multiple patterns based on the waveform, the repeated sets having a varying pattern spacing in the printing axis under calibration.

15 Claims, 4 Drawing Sheets

(58) Field of Classification Search
CPC .. B41J 2/0456; B41J 2/04561; B41J 2/04563; B41J 2/04565; B41J 2/04566; B41J 2/04556; B41J 2/08; B41J 2/085
See application file for complete search history.

(56) References Cited

U.S. PATENT DOCUMENTS

| | | | |
|---|---|---|---|
| 6,474,767 | B1 | 11/2002 | Teshigawara et al. |
| 7,889,223 | B2 | 2/2011 | Klement et al. |
| 8,866,861 | B2 | 10/2014 | Schuh et al. |
| 8,939,540 | B2 | 1/2015 | Fletcher et al. |
| 9,802,403 | B2 | 10/2017 | Harjee et al. |
| 2006/0119633 | A1 | 6/2006 | Hsu et al. |
| 2006/0158476 | A1 | 7/2006 | Ng et al. |
| 2007/0076039 | A1 | 4/2007 | Batalla et al. |
| 2007/0229923 | A1* | 10/2007 | Itagaki ............... H04N 1/00031 358/504 |
| 2009/0002429 | A1 | 1/2009 | Puigardeu et al. |
| 2010/0039466 | A1 | 2/2010 | Takahashi et al. |
| 2014/0126000 | A1* | 5/2014 | Chong ................. G06K 15/027 358/1.8 |
| 2014/0153006 | A1* | 6/2014 | Yorimoto ............ G06K 15/027 358/1.5 |
| 2015/0099059 | A1 | 4/2015 | Harjee et al. |
| 2017/0036467 | A1 | 2/2017 | Seki et al. |

FOREIGN PATENT DOCUMENTS

| | | |
|---|---|---|
| CN | 105690759 | 6/2016 |
| CN | 106794701 | 5/2017 |
| CN | 107206697 | 9/2017 |
| CN | 107206784 | 9/2017 |

* cited by examiner

INTERFERENTIAL PATTERNS FOR PRINTER CALIBRATION

BACKGROUND

In a printing system, patterns may be printed to help calibrate a printer. For example, a scanning ink-jet printer may comprise inkjet pens mounted on a moveable carriage. Each pen may include a printhead having a plurality of inkjet nozzles. During printing, the carriage may move across a print medium, such as a sheet of paper, while the nozzles discharge ink drops. The timing of the ink drop ejection may be controlled to precisely place the drops at desired locations. In such an ink-jet printer, patterns may be printed to calibrate an alignment of the printhead, such that ink may be deposited in the correct locations. For example, misalignment may occur due to movement of the printhead within a mounting of the carriage, mechanical misalignments of the carriage and/or misalignments within a media transport system.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein.

DETAILED DESCRIPTION

Certain examples described herein provide a form of interferential pattern that enables calibration of a printer within a printing system. This specially-shaped pattern is robust to aliasing. It can also accommodate missing and/or malfunctioning nozzles. It enables a signal-to-noise ratio to be increased without additional filtering of captured data. It may be used to calibrate alignment of printheads and/or media transport systems.

Figure 1:
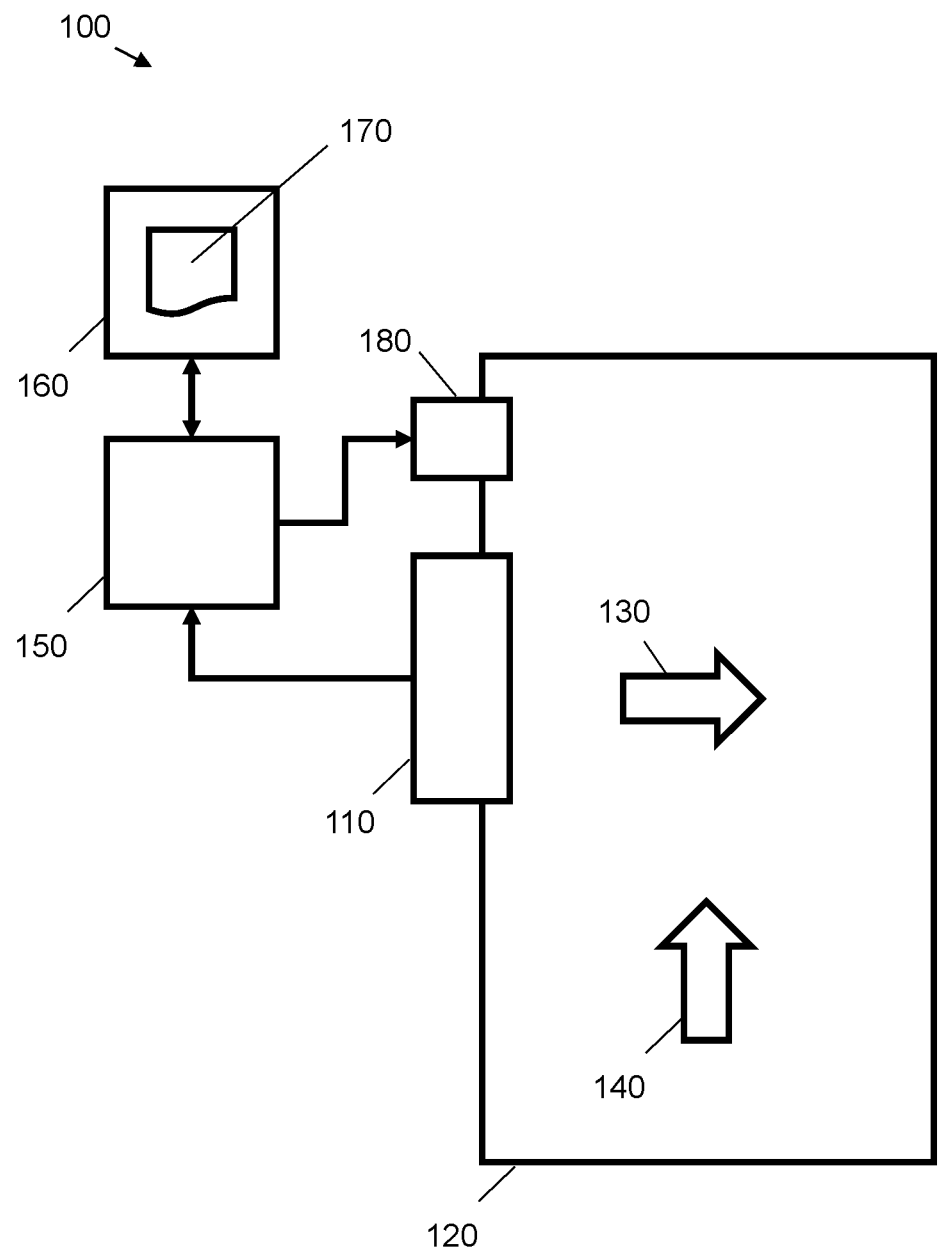
FIG. 1 is a schematic illustration of a printing system according to an example.

FIG. 1 shows a printing system 100 according to an example. The printing system 100 may comprise a two-dimensional or three-dimensional printing system. The printing system comprises a printhead 110 to print an image on a print medium 120. In a three-dimensional printing system, a printer may deposit an agent, such as a modelling agent, onto a bed of build material, such as a bed of powdered build material.

In the example of FIG. 1, the printhead 110 moves across a width of a print medium in direction 130, while the print medium 120 advances underneath the printhead 110 in direction 140. The print medium may comprise a sheet or continuous web of media. Any form of print media may be used, including, amongst others, paper, cardboard (i.e. corrugated media), fabric, and polymer films. In a three-dimensional printing system, the print medium may comprise a sheet of media, such as paper, or a bed of build material.

The printhead 110 may comprise a plurality of nozzles. These nozzles may be aligned in one or more columns along a length of the printhead, e.g. in a direction parallel to direction 140 in FIG. 1. For example, the printhead 110 may comprise an ink-jet printhead. Ink or a modelling agent may be ejected through the nozzles of the printhead. The printhead may be a thermal or piezo-electric printhead. In certain cases, the printhead may be mounted within a carriage that moves across the print medium 120 in direction 130. Ink is used here as an example, other printing fluids such as pre-printing and post-printing agents (e.g. varnishes, glosses, under-treatments) may alternatively be deposited by the printhead 110.

In other examples, the printhead may form part of a page wide array printer. In these examples, there may be no movement in direction 130; instead, a plurality of printheads may extend across a width of the print medium 120. In this case, a position of a printed image on the print medium 120 in direction 130 may be controlled through activation of different nozzles along the width of the page wide array.

The printing system 100 of FIG. 1 further comprises a calibration controller 150. The calibration controller 150 may comprise a printed circuit board and/or integrated circuitry. The calibration controller 150 may be located within a printer of the printing system 100 or may comprise a computer system that is electronically coupled to such a printer. The calibration controller 150 may form part of a control sub-system that is electronically-coupled to a wider control system, e.g. may be coupled over a system bus to other printed circuit boards. The calibration controller 150 may comprise a processor in the form of a central processing unit, microprocessor or system-on-chip device. In FIG. 1, the calibration controller 150 is electronically coupled to a memory 160. The memory 160 may comprise volatile and/or non-volatile memory. In certain cases, the memory 160 may comprise non-volatile memory to store instructions for the calibration controller 150 and configuration data for the printing system. Data may be transferred from the non-volatile memory to the volatile memory during operation, wherein a processor of the calibration controller 150 may access data and instructions stored in the volatile memory. The volatile memory may comprise any form of Random Access Memory (RAM) and the non-volatile memory may comprise solid-state memory, magnetic storage devices, and/or Read Only Memory (ROM), amongst others. Instructions stored in memory 160 may be loaded and executed by a processor of the calibration controller 150 to effect the functionality described herein.

In the example of FIG. 1, the memory 160 stores a definition 170 of a print calibration image. In the present example, the print calibration image comprises varyingly-spaced interferential patterns in a printing axis. The printing axis may comprise one of directions 130 or 140. Multiple printing axes may be calibrated, wherein each printing axis has a different print calibration image. In one case, the definition 170 of the print calibration image may comprise an image to be printed, e.g. in the form of a bitmap or the like. In another case, the definition 170 of the print calibration image may comprise a function definition to generate the print calibration image. In this case, the definition 170 of the print calibration image may comprise program code and parameter values that control the printhead 110 to produce the print calibration image on a print medium. In any case, the calibration controller 150 is configured to obtain the definition 170 of the print calibration image from memory 160 and to instruct printing of the print calibration image using printhead 110. In the example of FIG. 1, this involves printhead 110 moving across the print medium 120 in direction 130. During the printing of the print calibration image the print medium 120 may also be advanced in direction 140, e.g. the printing may comprise multiple scans across the print medium 120 in direction 130 as the print medium 120 is advanced in direction 140.

In FIG. 1, the printing system 100 also comprises an optical sensor 180. The optical sensor 180 is configured to capture data from a printed image. The optical sensor 180 may comprise a reflectance sensor that is arranged to measure an intensity of reflected light, e.g. an intensity of light that is originally emitted by the optical sensor and that is reflected from the print medium 120. In other examples, the optical sensor 180 may capture light that is emitted by another component of the printing system 100.

In the example of FIG. 1, the optical sensor 180 is also configured to scan across the width of the print medium 120 in direction 130. For example, the optical sensor 180 may be mounted in the same moveable carriage as the printhead 110 or may be mounted in an independently-moveable carriage. In other examples, the optical sensor 180 may extend across the width of the print medium 120, e.g. such as in a page wide array printer. If the optical sensor 180 is mounted after the printhead 110 in direction 140, as shown in FIG. 1, a scan of optical sensor 180 in direction 130 (or a read-out of a static page wide array sensor) may measure a particular strip or swathe of a print calibration image as previously printed by the printhead 110. If the optical sensor is mounted across a width of the print medium, it may be arranged to output data from a plurality of spatial positions across the print medium.

In certain cases, the optical sensor 180 comprises a line sensor, i.e. it outputs a measured light intensity value for a given field of view in directions 130 and 140. An example field of view may be between 1 and 2 mm in both directions. Following a scan of the print medium 120, the optical sensor 180 may output an array of light intensity values that correspond to different lateral positions across the width of the print medium 120. The array may comprise a one dimensional array of length n, where n equals a number of measurements corresponding to a number of spatial positions across the width of the print medium 120. For example, n may equal 1000.

In certain examples described herein, the interferential patterns of the print calibration image comprise a waveform that varies in amplitude along an axis perpendicular to the printing axis being calibrated. Example waveforms are described later herein with reference to FIGS. 2, 4 and 6. These patterns avoid the firing of all the nozzles of the printhead 110 at the same time, e.g. as compared to a straight line in direction 140. They also reduce an effect of aliasing by the optical sensor 180. For example, when the optical sensor 180 scans a comparative pattern comprising a series of straight lines in direction 140, there will be some spatial aliasing due to each line entering and leaving the field of view of the optical sensor 180. This may generate a noisy signal as described later with reference to FIG. 3. By using a waveform that varies in amplitude along an axis perpendicular to the printing axis being calibrated, the pattern itself provides inherent antialiasing as it is captured by the optical sensor 180. This reduces noise such that post processing of the captured data (e.g. using a low-pass or moving average filter) may be reduced or avoided.

In the example of FIG. 1, the calibration controller 150 receives captured data from the optical sensor 180, wherein the captured data relates to measurement of a previously printed print calibration image. This captured data is then processed to determine calibration parameters for the printing system 100. For example, the calibration controller 150 may be configured to detect an extrema, such as a maxima or minima, within the captured data. An extrema may indicate a spatial position where reflectance is maximized, e.g. where two spaced interferential patterns are most closely aligned. This spatial position may be used to determine a misalignment within the printing system 100. This misalignment may then be corrected, e.g. by configuring an offset or the like.

Figure 2:
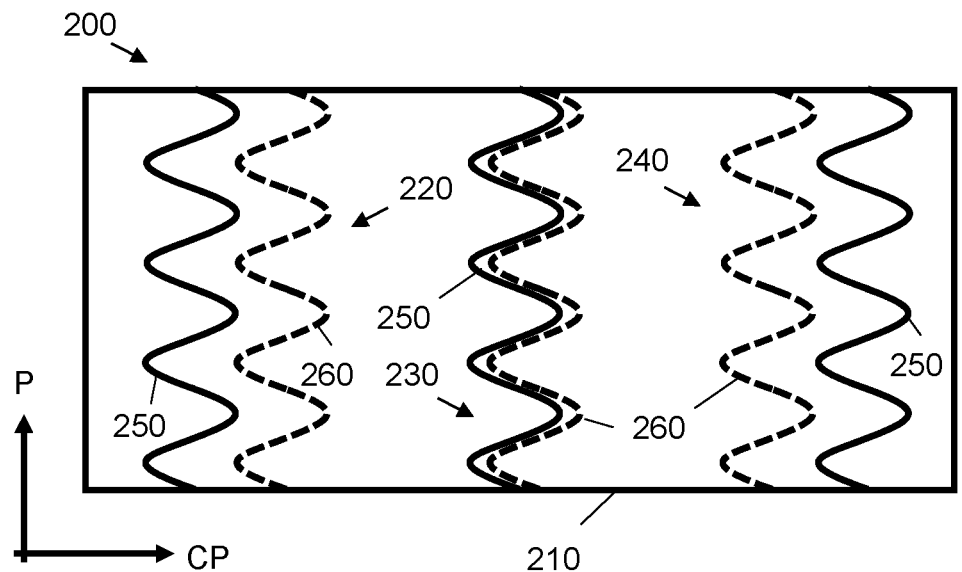
FIG. 2 is a schematic illustrations showing an interferential pattern for a cross-pen printing axis according to an example.

FIG. 2 shows a simplified example 200 of a print calibration image 210. This may comprise a print calibration image for a printing axis that is parallel to a scanning axis of a printing system, e.g. a printing axis parallel with direction 130 in FIG. 1. This printing axis may be referred to as a "cross-pen" (CP) axis, wherein a length of a printhead comprises a "pen" (P) axis. The pen axis may comprise an axis along which nozzles of the printhead are aligned (e.g. a number of nozzles in a pen axis direction may be much greater than a number of nozzles in a cross-pen axis). The cross pen axis may be parallel to a direction in which a carriage comprising the printhead moves, i.e. may correspond to a direction across a width of a print medium.

FIG. 2 shows three repeated sets of patterns 220, 230 and 240 based on a common waveform. In FIG. 2, the waveform is a sinusoidal waveform. In this example, each repeated set of patterns comprises two patterns: a first pattern 250 and a second pattern 260. These are represented by solid and dashed lines in FIG. 2. These patterns have varying spacing in the cross-pen direction. For example, a spacing between the two patterns decreases towards the center of the print calibration image in FIG. 2. For clarity, a reduced number of patterns are shown in FIG. 2; in certain implementations there may be any number of repeated sets of patterns depending on the printer configuration (e.g. 20 to 40 is one example). In FIG. 2, both the patterns extend along an axis parallel to the pen axis.

In certain cases, the first pattern 250 in the set of repeated patterns may be printed with a first printhead. In this case, the second pattern 260 may be printed with a second printhead. For example, the two printheads may form part of printer pens with different color inks. If the printheads are aligned, then the two patterns should overlap (i.e. interfere) in the center of the print medium. If the printheads are misaligned, then one of the other sets of patterns may overlap. For example, if the first printhead has been displaced in the cross pen direction (e.g. to the right in FIG. 2), then patterns 220 may overlap instead of patterns 230. In more complex cases, there may be more than two patterns corresponding to a plurality of printheads. However, often analysis can be simplified by performing pairwise calibration between multiple printheads. In this case, the first printhead may be seen as belonging to a reference pen and the second printhead may be seen as belonging to a pen under measurement.

In certain cases, both the first pattern 250 and the second pattern 260 may be printed using the same printhead. For example, in a bi-directional calibration, the first pattern 250 may be printed by a printhead travelling in direction 130 and the second pattern 260 may be printed by the same printhead travelling in the opposite direction across the width of the print medium (e.g. on a return pass). In another case, a printhead may have more than one die or column of nozzles. In this case, the first pattern 250 may be printed by a first die or column of nozzles within a printhead and the second pattern 260 may be printed by a second die or column within the same printhead. In other cases, the first pattern 250 may be printed and then the print medium may be moved before printing the second pattern 260. In this case, the patterns may be used to determine an alignment of a media transport system. As may be understood, sets of two patterns are given as an example, each repeated set may comprise more than two patterns, e.g. if calibrating more than two printheads or nozzle columns.

In certain examples, the waveform is configured such that a field of view of an optical sensor arranged to scan over the print calibration image in the cross-pen direction is a non-zero multiple of the period of the waveform. For example, if the optical sensor has a field of view of 1.5 mm, then the period of the waveform may be 0.375 mm or 0.75 mm.

Figure 3:
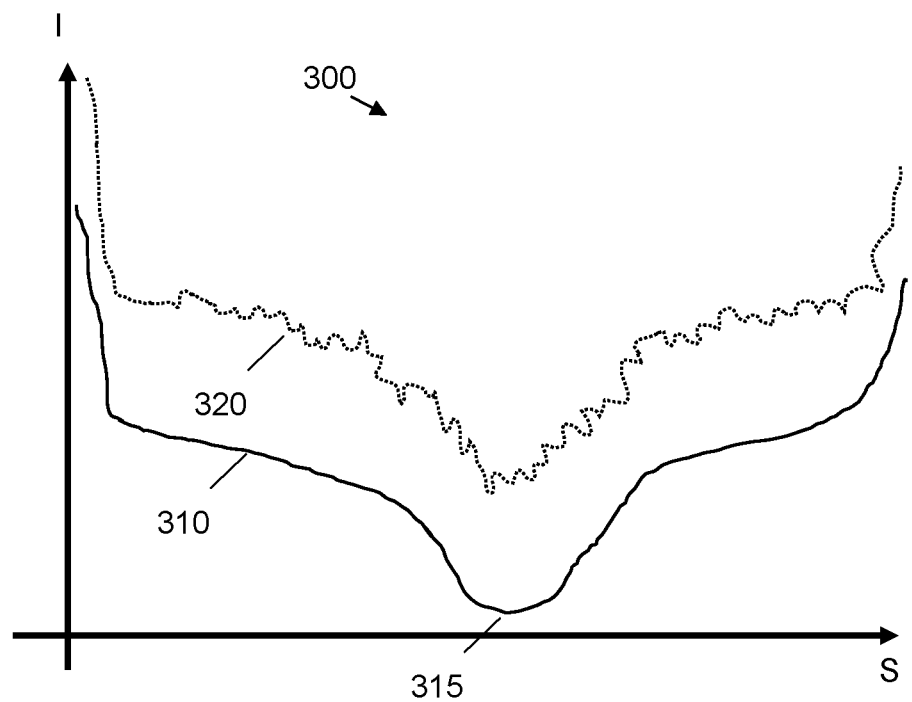
FIG. 3 is a chart showing captured data according to an example.

FIG. 3 is a chart 300 showing captured data according to an example. The x-axis represents a spatial dimension, e.g. corresponding to measurement locations across a width of a print medium. The y-axis represents an optical measurement value, such as a measurement of light intensity. In FIG. 3, line 310 represents data values output by an optical sensor. For example, these data values may comprise a one-dimensional array of light intensity values that are generated as an optical sensor scans across the print calibration image 210 in FIG. 2. Line 310 has a minima 315 where the first and second patterns 250 and 260 interfere. By reading an x-axis value for this minima 315, a misalignment may be determined.

For example, a perfectly aligned printing system may print the print calibration pattern 210 such that the minima 315 occurs at spatial location 500 out of 1000, i.e. in the center of the image. A misaligned printing system may print the print calibration pattern 210 such that the minima 315 occurs at different spatial location, e.g. a spatial location of 400 out of 1000, would indicate a misalignment of −100, or a spatial location of 600 out of 1000, would indicate a misalignment of +100. The measured misalignment may then be used to calibrate future printing operations, e.g. in the aforementioned examples a print offset may be respectively set to +100 or −100 to return the minima 315 to the center of the printed image. In certain cases, a set of misalignments may be converted into a measurement based on a number of dots at a particular resolution. For example, a misalignment or error may be measured in a range of −5 to +5 dots at a 1200 dots per inch (DPI) resolution. This may correspond to a range of raw x-axis positions running from −500 to 500 (e.g. a range of x-axis positions of [−500, −400, −300, −200, −100, 0, 100, 200, 300, 400, 500]). If a minima falls at an x-axis value of −100 this may be mapped to a −1 dot error. In this case, a correction may involve printing an image shifted by 1 dot. In certain cases, subdot resolution may be possible, e.g. a minima of −125 may equate to an error of 1.25 dots. In other cases, misalignment values may be grouped into discrete bins, e.g. a minima of −125 may be grouped into a −1 dot error group.

FIG. 3 also shows a line 320 that indicates an output that may be generated when an optical sensor scans a comparative print calibration image that comprises a series of straight lines aligned with direction 140. As may be seen, the data represented by line 320 is noisy and has a jagged or saw-tooth shape. This variation in the data is often filtered before an extrema may be located (e.g. it may cause signal processing functions to find a local minima rather than the global minima). This filtering may affect the location of the located extrema after processing, e.g. a moving average filter may shift the location of the minima such that any correction has a small error. In comparison, the line 310 represents the signal as received from the optical sensor when scanning the waveform described herein; using this waveform post-processing of the signal may be avoided.

In certain example, an optical sensor as described herein may measure diffuse reflectance from a surface of print media when illuminated by one or more Light Emitting Diode (LED) illuminants. Such an optical sensor may function by projecting illumination at an angle onto the print media. In this case, the light may strike the paper at an intersection of an optical axis of a central diffuse-reflectance imaging lens. Reflected illumination may then be imaged onto two detectors, such as two light-to-voltage converters. In a case, with two detectors, a central detector may capture a diffuse component of the illumination's reflectance and an outside detector may capture a specular component of the reflectance.

Figure 4:
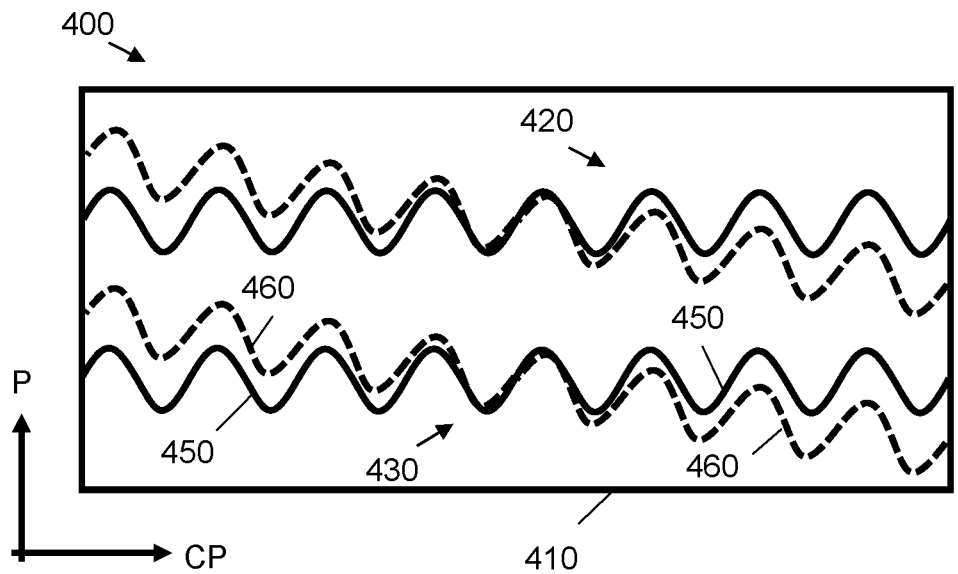
FIG. 4 is a schematic illustration showing an interferential pattern for a pen printing axis according to an example.

FIG. 4 shows a simplified example 400 of another print calibration image 410. This may comprise a print calibration image for a printing axis that is perpendicular to a scanning axis of a printing system, e.g. a printing axis parallel with direction 140 in FIG. 1. This printing axis may be the pen axis as previously described.

FIG. 4 shows two repeated sets of patterns 420, 430 based on a common waveform. In FIG. 4, the waveform is a sinusoidal waveform. In this example, each repeated set of patterns comprises two patterns: a first pattern 450 and a second pattern 460. These are represented by solid and dashed lines in FIG. 4. Again these patterns may be printed by different printheads. These patterns have varying spacing in the pen direction. In FIG. 4, this is achieved by rotating a spatial axis of the second pattern with respect to the first pattern (the spatial axis being perpendicular to the amplitude axis). This results in the second pattern 460 being spaced above the first pattern 450 to the left of the center of the print calibration image 410, and then the second pattern 460 being spaced below the first pattern 450 to the right of the center of the print calibration image 410. As can be seen, a spacing between the two patterns decreases towards the center of the print calibration image 410 in FIG. 4. For clarity, a reduced number of patterns are shown in FIG. 4; in certain implementations there may be 10 to 30 repeated sets of patterns.

When using the print calibration image 410 of FIG. 4, an optical sensor may scan along the spatial axis of the first pattern 450, wherein a measured reflectance signal is minimized when the two patterns interfere. The waveform may again be configured such that a field of view of the optical sensor, e.g. in the pen direction, is a multiple of a period of the waveform.

Data obtained from an optical sensor scanning the print calibration image 410 of FIG. 4 may resemble the line 310 shown in FIG. 3. While the pattern of FIG. 4 varies on the print medium from the pattern of FIG. 2, a data signal may appear similar as the optical sensor integrates a reflectance from the print medium.

The interferential pattern shown in FIG. 4 may reduce or avoid undesired effects of missing and/or malfunctioning nozzles as not all nozzles are involved in printing the pattern. In contrast, a comparative straight line pattern may be printed with a large proportion of the nozzles in a printhead, e.g. a column of nozzles in the pen axis. In this comparative case, a missing and/or malfunctioning nozzle leads to a higher than expected reflectance measurement that corrupts subsequent signal processing. The missing and/or malfunctioning nozzle may be in a reference pen or pen being measured.

The interferential patterns described herein also reduce demands on nozzles of printheads used in the calibration process. For example, the variance of the waveform means that nozzles do not have to fire simultaneously at high frequencies. If nozzles do not have to simultaneously at high frequencies printhead and nozzle lifespan may be increased, peak current consumption may be reduced and a quality of ink drops ejected may be increased. For example, when using the patterns shown in FIG. 2, at any location across the width of the print media (e.g. in direction 130) a small subset of nozzles are firing. This subset then changes for a subsequent location (e.g. following movement in direction 130). With a comparative straight line pattern, many nozzles within a column in the pen-axis fire in a given pass of the printhead to print a line. Likewise, when using the patterns shown in FIG. 4, there is no nozzle that is continually firing across the width of the print media. In comparison, a straight line pattern often has one set of nozzles for at least a reference pattern that fire continuously at high frequencies across the width of the print medium. In comparative cases, nozzle strain may be reduced by printing multiple passes; however, the presently described examples reduce nozzle strain while using a single pass. Additionally, multiple passes are slower and may lead to additional displacements occurring between passes.

Figure 5:
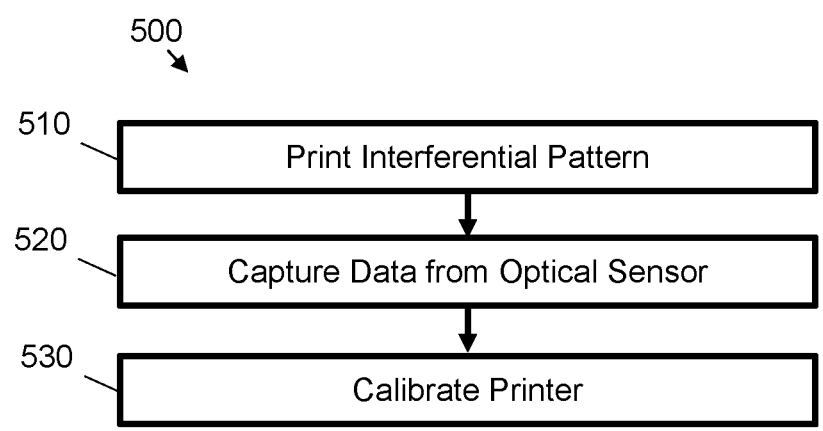
FIG. 5 is a flow diagram showing a method of calibrating a printer according to one example.

FIG. 5 shows a method 500 of calibrating a printer according to an example. At block 510, an interferential pattern is printed on a print medium. The interferential pattern is based on a waveform that varies in amplitude along an axis perpendicular to a printing axis under calibration, e.g. as shown in FIGS. 2 and 4. The interferential pattern comprises repeated sets of multiple patterns based on the waveform, e.g. as represented by the first and second patterns 250 and 260 in FIG. 2 and the first and second patterns 450 and 460 in FIG. 4. The repeated sets of patterns have a varying pattern spacing in the printing axis. For example, at the beginning of the repeated sets, a first pattern may lead the second pattern by an amount m. Across the repeated sets, m may decrease until at the end of the sets, the second pattern leads the first pattern by the amount m. At block 520, data representative of the interferential pattern as printed on the print medium is captured using an optical sensor. This may comprise obtaining data as shown by line 310 in FIG. 3. At block 530, the printer is calibrated based on the captured data. For example, an extremum may be detected in the captured data and a spatial location corresponding to the extremum may be to calibrate the printer, e.g. set an offset to align the printed.

In certain cases, block 510 may be repeated for each of a pen and cross pen printing axis, wherein a pen axis corresponds to a length axis of a printhead along which nozzles are aligned. The printer may then be calibrated in both a pen and cross pen axis. Calibration in a pen axis may comprise setting a nozzle offset to shift a pattern of firing up or down the length axis of the printhead, e.g. a pattern of firing may be shift by a nozzles where a is proportional to a detected misalignment. Calibration in a cross pen axis may comprise setting a scanning offset to control a position of a moveable carriage in which the printhead is mounted, e.g. an offset of b mm may be added or removed to a designated carriage position where b is proportional to a detected misalignment.

Figure 6:
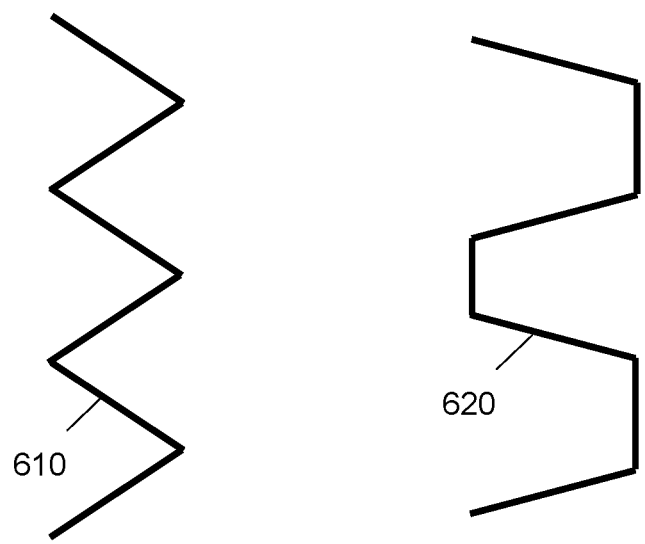
FIG. 6 is a schematic illustration showing two interferential pattern waveforms according to examples.

FIG. 6 shows two other examples of a waveform that may be used to generate an interferential pattern as described herein. Waveform 610 comprises a saw-tooth waveform and waveform 620 shows a modified square wave. In practice other waveforms may also be used.

Figure 7:
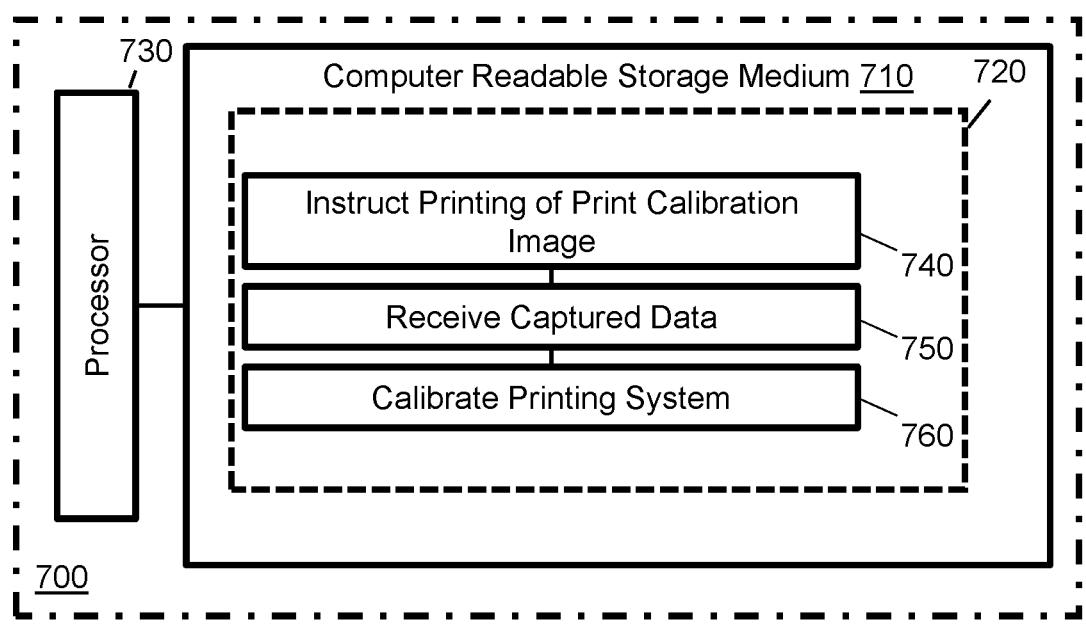
FIG. 7 is a schematic illustration showing a non-transitory computer-readable storage medium according to an example.

FIG. 7 shows an example 700 of a non-transitory computer-readable storage medium 710 comprising a set of computer-readable instructions 720. The instructions 720 are executable by a processor 730 of a printing system. The computer readable storage medium 710 may be a memory of a processor such as an embedded processor or microprocessor that forms part of a printing system, e.g. forms part of a printer. The memory may comprise a non-volatile memory where instructions are stored when no power is supplied and a volatile memory where instructions are loaded during use for execution by the processor.

Instruction 740 causes the processor to instruct printing of a print calibration image using the printing system. The print calibration image may include an interferential pattern as described herein. Instruction 750 causes the processor to receive captured data from an optical sensor associated with the print calibration image. Instruction 760 causes the processor to calibrate the printing system based on the captured data. As such these instructions may implement the method of FIG. 5 and use the print calibration images described in the other examples.

As with the other examples, the waveform may comprise a continuous sinusoidal waveform with multiple periods. In certain cases, the printing axis comprises a scanning axis of a printhead of the printing system, e.g. such as direction 130 in FIG. 1. In this case, the instructions may cause the processor to determine a location within the scanning axis corresponding to a minima within the captured data, e.g. as shown in FIG. 3. In certain cases, the printing system comprises an ink-jet printing system.

The preceding description has been presented to illustrate examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method of calibrating a printer comprising:
   printing an interferential pattern on a print medium;
   capturing data representative of the interferential pattern as printed on the print medium using an optical sensor;
   calibrating the printer based on the captured data,
   wherein the interferential pattern is based on a waveform that varies in amplitude along an axis perpendicular to a printing axis under calibration, and
   wherein the interferential pattern comprises repeated sets of multiple patterns based on the waveform, the repeated sets having a varying pattern spacing in the printing axis under calibration.

2. The method of claim 1, wherein the waveform comprises a sinusoidal waveform.

3. The method of claim 1, wherein a field of view of the optical sensor is a non-zero multiple of a period of the waveform.

4. The method of claim 1, wherein printing an interferential pattern comprises:
   printing a first set of patterns based on the waveform using a first printhead; and
   printing a second set of patterns based on the waveform using a second printhead, wherein the first and second sets of patterns comprise the repeated sets of multiple patterns based on the waveform, and
calibrating the printer comprises aligning the first and second printheads based on the captured data.

5. The method of claim 1, wherein calibrating the printer comprises:
detecting an extremum in the captured data; and
using a spatial location corresponding to the extremum to calibrate the printer.

6. The method of claim 1, wherein printing an interferential pattern comprises:
printing an interferential pattern for a printing axis perpendicular to a length axis of a printhead; and
printing an interferential pattern for a printing axis parallel to a length axis of a printhead,
wherein nozzles of the printhead are aligned along the length axis of the printhead.

7. A printing system comprising:
a printhead to print an image on a print medium;
an optical sensor to capture data from a printed image;
a memory to store a definition of a print calibration image, the print calibration image comprising varyingly-spaced interferential patterns in a printing axis, the interferential patterns comprising a waveform that varies in amplitude along an axis perpendicular to the printing axis; and
a calibration controller to calibrate the printing system in the printing axis comprising a processor to:
obtain the definition of the print calibration image from memory;
instruct printing of the print calibration image using the printhead;
receive captured data from the optical sensor associated with the print calibration image; and
process the captured data to determine calibration parameters for the printing system.

8. The printing system of claim 7, wherein the optical sensor comprises a reflectance sensor.

9. The printing system of claim 7, comprising:
a moveable carriage in which the printhead is mounted,
wherein nozzles extend along the printhead in a pen-axis direction perpendicular to a scanning direction of the moveable carriage,
wherein the printing axis is at least one of the pen-axis direction and the scanning direction.

10. The printing system of claim 9, wherein the optical sensor is configured to move across the print medium in the scanning direction.

11. The print system of claim 10, wherein the captured data comprises measured light intensity values for a plurality of spatial locations across a width of the print medium.

12. A non-transitory computer-readable storage medium comprising a set of computer-readable instructions stored thereon, which, when executed by a processor of a printing system, cause the processor to:
instruct printing of a print calibration image using the printing system, the print calibration image comprising varyingly-spaced interferential patterns in a printing axis, the interferential patterns comprising a waveform that varies in amplitude along an axis perpendicular to the printing axis;
receive captured data from an optical sensor associated with the print calibration image; and
calibrate the printing system based on the captured data.

13. The medium of claim 12, wherein the waveform comprises a continuous sinusoidal waveform with multiple periods.

14. The medium of claim 12, wherein the printing axis comprises a scanning axis of a printhead of the printing system and the instructions cause the processor to:
determine a location within the scanning axis corresponding to a minima within the captured data.

15. The medium of claim 12, wherein the printing system comprises an ink-jet printing system.

* * * * *